United States Patent [19]

Prince et al.

[11] Patent Number: 4,818,590

[45] Date of Patent: Apr. 4, 1989

[54] WOOD VENEER COVERED STRUCTURAL RIGID PLASTIC FOAM ELEMENTS

[75] Inventors: Kendall W. Prince, West Valley City; Jack R. Prince, Farmington, both of Utah

[73] Assignee: Princewood, West Valley City, Utah

[21] Appl. No.: 65,355

[22] Filed: Jun. 22, 1987

[51] Int. Cl.⁴ .................... B32B 5/18; B32B 21/08
[52] U.S. Cl. .................... 428/213; D6/577; 160/236; 160/405; 428/318.4; 428/904.4
[58] Field of Search ............ 428/158, 213, 220, 318.4, 428/904.4; D6/577; 160/236, 405

[56] References Cited

U.S. PATENT DOCUMENTS

| | | | |
|---|---|---|---|
| 3,226,284 | 12/1965 | Curtis | 428/904.4 X |
| 3,921,694 | 11/1975 | Galex | 160/172 X |
| 3,959,050 | 5/1975 | Hooper, Jr. | 428/318.4 X |
| 3,976,526 | 8/1976 | Hovey et al. | 156/212 |
| 4,078,959 | 3/1978 | Palfey et al. | 428/121 X |
| 4,136,215 | 1/1979 | denOtter et al. | 428/143 X |
| 4,255,221 | 3/1981 | Young | 156/382 |
| 4,336,834 | 6/1982 | Schaller | 160/236 X |
| 4,351,870 | 9/1982 | English, Jr. | 428/174 |
| 4,402,170 | 9/1983 | Seidner | 52/71 X |
| 4,436,136 | 3/1984 | Downey, Jr. | 160/236 X |
| 4,471,710 | 9/1984 | Brown | 114/358 X |

*Primary Examiner*—Henry F. Epstein
*Attorney, Agent, or Firm*—Thorpe, North & Western

[57] ABSTRACT

A decorative structural element suitable for making venetian type window blinds, room dividers, furniture panels, room and furniture decorations and the like are disclosed. The element comprises a structurally stable, resilient, rigid plastic foam substrate having opposing surfaces having a wood veneer adhering to at least one of the surfaces. The thickness of the substrate is not in excess of 10 mm, and preferably is 5 mm or less. The veneer is sufficiently thin, relative to the substrate, that the structural properties of the substrate, such as resiliency, are not materially affected by the veneer.

11 Claims, 1 Drawing Sheet

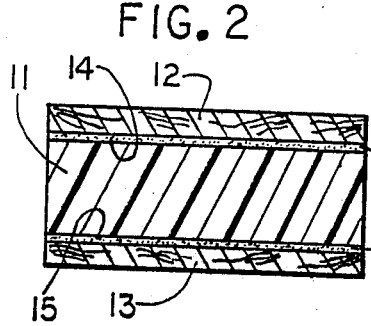
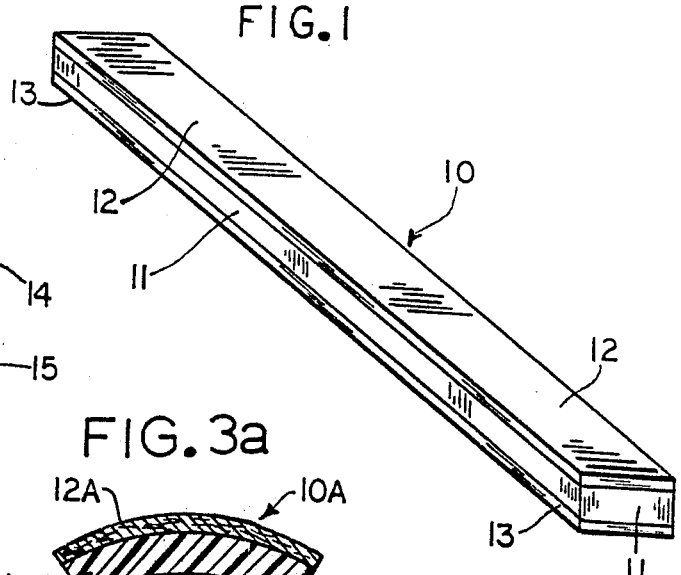
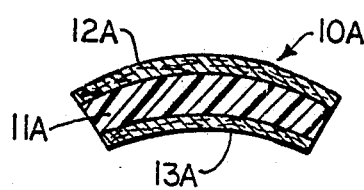
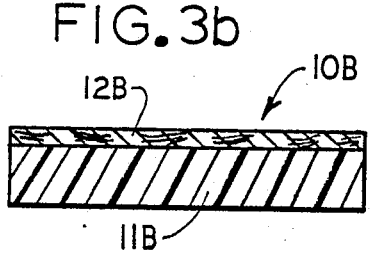
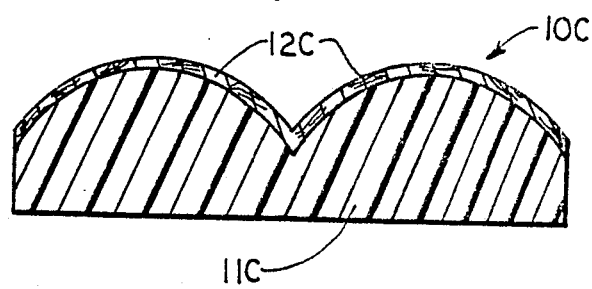
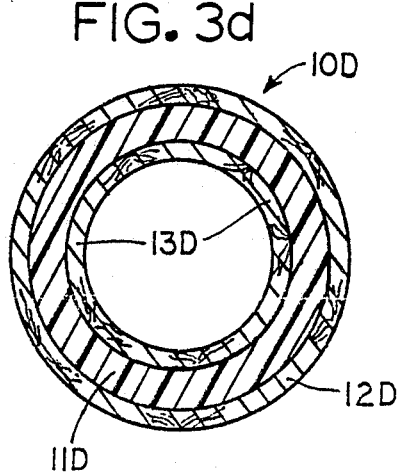
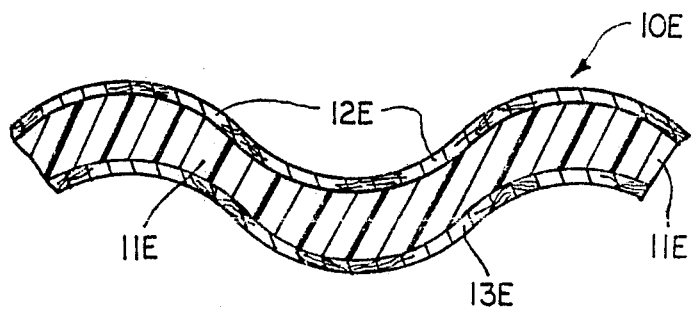

WOOD VENEER COVERED STRUCTURAL RIGID PLASTIC FOAM ELEMENTS

BACKGROUND OF THE INVENTION

This invention relates to thin structural foamed plastic elements covered with a wood veneer which does not materially alter the durability or resilient properties of the foamed structural elements while providing them with a permanent decorative coating. More particularly, this invention relates to rigid flexible foamed plastic structural elements covered with a thin wood veneer wherein the wood, although securely bonded to the foamed plastic substrate, does not materially affect the structural properties of the element.

It is well known in the art to apply thin veneers of wood, plastic, metal, foil, canvas, paper, etc. to structural substrates for decorative purposes. Normally the substrate is relatively thick and is made of various types of fibrous cellulosic materials. For example, plywood, particle board, solid wood and the like have been used. It is also known to use veneers over rigid non-cellulosic building materials such as sheet rock, metal, thick foamed plastics and the like. Most foamed plastics are friable and have limited utility except when utilized with other structural materials of sufficient strength and rigidity that the physical properties of such other materials provide the structural strength. For example, modular building panels consisting of a foam sandwich having a plywood (or other) exterior and a sheet rock, wood paneling (or other) interior are known wherein the foam imparts insulating properties but does not contribute to the structural strength.

It would be desirable to have durable, resilient structural elements which have the appearance of wood but do not have the inherent drawback associated with thin solid wood elements.

In such fields of use as decorative venetian type blinds, either horizontally or vertically hung, there is a limitation to the materials which may be utilized. Such materials are generally metal or solid, homogeneous plastic slats or panels. In vertically arranged blinds some heavy woven fabrics such as canvas or burlaps have also been used. Wood slats have also been used but become dry and brittle and break or split easily because of their structural weakness. In addition, wood slats often warp and do not retain their desired shape.

Because the grains in wood patterns are appealing to the eye and are associated with quality materials, structural elements of plastic or metal are sometimes printed, painted, embossed or otherwise coated with a patterned material to simulate wood. However, it is quite apparent to the trained eye that these are only imitations of the real material. Other decorative structural element materials also have the same drawbacks.

Thin plastic or metal structural elements have also been used for room dividers, office accessories, desk panels, picture and door frames, furniture decorations and the like. These are subject to physical distortion by bending, denting, warping and the like. Homogeneous plastic elements are also sometimes distorted by elevated temperatures. Metal elements are easily dented, bent or otherwise disfigured.

There are also other situations where it would be desirable to have a thin structural element which would be durable, have sufficient pliancy and resiliency that it would conform to various shapes and have the ornate appearance of a quality wood product.

OBJECTS AND SUMMARY OF THE INVENTION

It is an object of the present invention to provide a thin structural element consisting of a rigid or semi-rigid foamed plastic substrate covered with a thin veneer of wood wherein the structural properties of substrate are not materially affected by the veneer.

It is also an object of the present invention to provide a decorative structural element which is durable, strong, not subject to warping or heat distortion, has the resiliency to conform to various physical configurations within limits and which has a pleasing decorative appearance of wood.

These and other objects may be provided by means of a structural element made up of a thin substrate of an appropriate rigid or semi-rigid foamed plastic having opposing surfaces at least one of which is covered by a decorative veneer of wood.

The physical properties of the structural element, and hence its utility, are dictated by the substrate and the wood veneer contributes primarily decorative properties. The plastic foam substrate is not more than 10 mm in thickness and preferably not more than 5 mm. The veneer may cover one or both surfaces of the substrate. The thickness of the wood veneer will be determined by point at which the physical properties of the substrate begin to be materially affected. Generally speaking, the total veneer thickness, whether contained on one or both substrate surfaces, will not be greater than about 33% of the substrate thickness and will preferably not be more than about 25%.

The semi-rigid or rigid plastic foam is preferably a foamed polyvinyl chloride but may be any other suitable plastic foam having the desired physical properties of strength, durability, resistance to distortion or impact, machinability, resiliency, weight, resistance to weathering and light, vibration absorption, resistance to water absorption and the like. In other words, if the plastic foam, used alone, could perform the desired structural element functions without the presence of the adhering wood veneer and can be bonded to wood, it is within the scope of suitable substrates for use in this invention. However, it should be made plain that the veneer is an integral and essential part of the invention. Without the wood veneer, the substrate would not be aesthetically functional. In the past aesthetically functional wood veneers have not been successfully applied to structurally functional substrates.

Suitable wood veneers are any which may be used to adhere to the substrate and are sufficiently thin and resilient that they do not detract from the physical characteristics of the substrate. Because of their ornate appearance, thin hardwood veneers are preferable.

BRIEF DESCRIPTION OF THE DRAWINGS

FIG. 1. is a perspective view of one embodiment of this invention showing a panel consisting of a foamed plastic substrate containing a wood veneer on both surfaces thereof.

FIG. 2 is a cross sectional view of the panel shown in FIG. 1 taken along lines 2—2 thereof.

FIGS. 3a–e are cross sectional views of other panel embodiments showing various structural configurations and also showing some panels having only a single veneer.

DETAILED DESCRIPTION OF THE INVENTION

There is shown in FIGS. 1 and 2 one complete and preferred embodiment of the invention.

FIG. 1 shows a perspective view of a structural element in the form of a panel 10 which would be suitable as a vertical venetian blind slat. Panel 10 consists of a rigid polyvinyl chloride foam substrate 11 having a thin wood veneer 12 and 13 adhering to the opposing surfaces thereof by means of adhesives 14 and 15.

The substrate is critical to the functionality of this invention and therefore must be selected with the desired properties which are required. Metals, noncellular or homogeneous plastics, wood and the like do not possess the requisite properties. Thick, friable plastic foams also will not function Therefore, it is essential that the substrate have the proper rigidity and also be lightweight, durable, strong, resilient, heat and water resistant, and capable of having a wood veneer bonded thereto. Typical of such plastic foams is a rigid polyvinyl chloride available in sheet form under the tradenames Trovicel and Sintra. These products are available in thicknesses varying from about 1 to 10 mm. and can be machined, cut, sawed, drilled, bent, punched, embossed, welded, glued, nailed, riveted, screwed and otherwise treated in manners similar to wood. They are lightweight, being approximately one-half the weight of homogeneous PVC materials, i.e. have a specific gravity of about 0.75 g/cm$^3$. They are strong with a typical panel having a tensile strength at yield of about 2000 psi, elongation at break of about 20%, a modulus of elasticity of about $130 \times 10^3$ psi and an impact strength of about 7 ft. lb/in. In addition they resist heat with a typical panel having a heat deflection temperature of 165° F., a coefficient of linear expansion of about $75 \times 10^{-6}$ in/in °C. and a thermal conductivity of about 0.084 W/(mxK). They are water resistant, a typical panel having a water absorption of only about 0.3%.

These and similar foamed plastic materials of like properties are considered to be unique when compared to homogeneous plastics, metals, wood and other materials which may be fabricated into thin sheets in that they possess many of the desired properties of wood but will not warp, break easily, weather and split. They can be thermoformed and retain their shape under all reasonably incurred conditions encountered in construction and during use.

The surfaces of the above described foamed plastics are similar to wood in that a veneer may be bonded to them in any conventional manner. Conventional contact wood adhesives and adhesives used in heat laminating and the like may be employed to attach the thin wood veneer layer to the surface.

The veneer must be thin in order not to significantly alter or interfere with the desirable physical characteristics of the substrate. However, without the veneer the substrate per se would have little commercial value in the making of venetian type blinds, coverings for furniture, interior decorating or in any other surface covering function.

Accordingly, the veneer must be selected on the basis of its decorative function or appearance as well as its compatibility with the substrate. By definition, a veneer is a thin ornamental or protective facing which is of superior value or appearance to its substrate. Because of the superior appearance of hardwoods, it is highly desirable that the veneers utilized in the present invention be made of hardwood such as oak, maple, walnut, mahogany, cherry, etc., bonded to the rigid plastic foam substrate. Such wood veneers having a thickness of about 0.25 to 1.0 mm. are elegant in appearance and give the impression that the structural elements made therefrom are of solid wood. For example, referring again to FIGS. 1 and 2, a venetian type blind panel vertically hung can be constructed with panels 10 being approximately 4 mm. thick and 3" wide and of any desired length. Of the 4 mm thickness the substrate 11 is about 3 mm and each wood veneer 12 and 13 is about 0.5 mm thick. The veneer does not prevent the substrate of the panel from bending, flexing, twisting or otherwise being manipulated within the limits and in the manner of conventional blind slats or panels. Moreover, the panel will not lose its configuration by warping, splitting, will not change in dimensions by shrinking or swelling and will not break upon impact as easily as wooden panels might. The panels remain resilient and will not bend or become distorted in shape as homogeneous plastic or metal panels might. However, each panel gives the appearance that it is made of solid, beautifully grained hardwood.

There is no strict mathematical ratio between veneer thickness and substrate thickness outside of which the invention will not function. Rather, the ratio is a functional one being dependent upon the point at which the veneer starts to inhibit the structural performance of the substrate. For the substrate to function appropriately, it is not more than 10 mm and preferably not more than 5 mm in thickness. Panels of 1 to 4 mm in thickness are particularly preferred. The veneer needs to be considerably thinner than the substrate in order not to interfere with desired the structural properties of the substrate. When using a single veneer on only one substrate surface the veneer can be thicker than when using two veneer coatings and making a sandwich panel. It has been found that the substrate should be at least two times thicker than the veneer and preferably at least three or more times greater. When using a sandwich panel having two veneer coatings it is preferred that each coating not be greater than one fourth of the substrate thickness and preferably not more than one sixth These are parameters which can be readily determined by one skilled in the art once the basic concept of the invention is realized.

FIGS. 3a–e show various other panel configurations which may be used. FIG. 3a shows a typical cross section of a horizontal venetian blind slat 10A comprising a contoured substrate 11A having adhered thereto wood veneers 12A and 13A. FIG. 3b is a cross section of a door panel 10B made up of a flat substrate 11B and a single veneer 12B. FIG. 3c is a cross section of an irregular surfaced panel 10C such as might be utilized on a picture frame consisting of an irregularly surfaced substrate 11C containing single veneer 12C. FIG. 3d shows a cross section of a cylinder 10D which might be used as the outer surface in the making of containers such as ice buckets, drinking cups or glasses, trash receptacles and the like made up from a sheet thermoformed into a circular substrate 11D containing a wooden outer veneer 12D and a plastic inner veneer 13D. FIG. 3e shows a panel 10E consisting of a corrugated substrate 11E containing veneers 12E and 13E of different hardwoods on either side and suitable for use as a divider for rooms or making cubicles.

We claim:

1. A structural element which comprises structurally stable, resilient, rigid plastic foam substrate having opposing surfaces and having a wood veneer adhering to at least one of said surface wherein thickness of the substrate is not in excess of 10 mm, and wherein the veneer is sufficiently thin, relative to the substrate, that the structural properties of the substrate are maintained.

2. A structural element according to claim 1 wherein the veneer is a hardwood.

3. A structural element according to claim 2 wherein the veneer thickness is not greater than 33% of the substrate thickness.

4. A structural element according to claim 3 wherein the substrate thickness is not in excess of 5 mm.

5. A structural element according to claim 4 wherein the substrate is a foamed polyvinyl chloride.

6. A structural element according to claim 5 wherein the veneer thickness is not greater than 25% of the substrate thickness.

7. A structural element according to claim 5 wherein both substrate surfaces are covered with a veneer.

8. A structural element according to claim 7 structured as a vertical venetian type blind panel.

9. A structural element according to claim 7 contoured and structured as a horizontal venetian type blind panel.

10. A structural element according to claim 7 structured to have an irregular surface.

11. A structural element according to claim 7 structured to have a curved surface.

* * * * *